Figure 1:
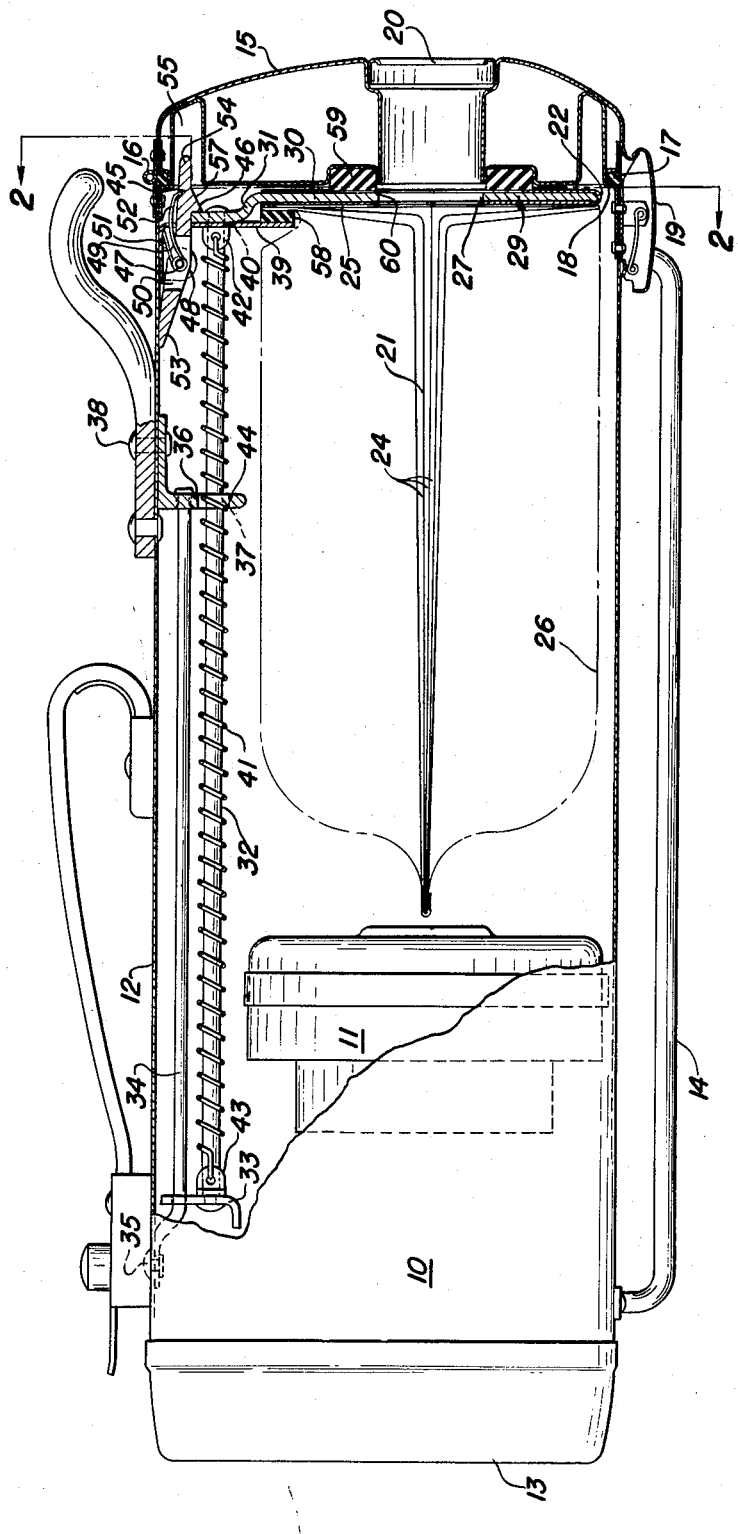

Aug. 14, 1956     G. A. BRACE     2,758,669
SUCTION CLEANER FILTER MOUNTING MEANS
Filed Jan. 12, 1955     4 Sheets-Sheet 1

Aug. 14, 1956   G. A. BRACE   2,758,669
SUCTION CLEANER FILTER MOUNTING MEANS

Filed Jan. 12, 1955   4 Sheets-Sheet 4

United States Patent Office 2,758,669
Patented Aug. 14, 1956

2,758,669

SUCTION CLEANER FILTER MOUNTING MEANS

George A. Brace, San Carlos, Calif., assignor to The Hoover Company, North Canton, Ohio, a corporation of Ohio Application January 12, 1955, Serial No. 481,370

11 Claims. (Cl. 183—37)

The instant invention relates to suction cleaners and more particularly to novel means for mounting a filter bag having a mounting pocket within a tank suction cleaner.

It is the prime objective of this invention to provide a novel means for mounting a filter bag having a mounting pocket in a tank suction cleaner, which means is simple in its construction and positive in its operation to effectively mount and secure the filter bag in the cleaner.

It is also an object of this invention to provide a novel filter bag mounting means for use with a suction cleaner in which the mounting means is operative to project the filter bag out of the cleaner to facilitate removal thereof for replacement by a clean filter bag, when occasioned by filling of the first filter bag to the point where it is no longer effective as a filter.

Another object of the instant invention is to provide a novel filter bag ejecting means of a relatively simple construction, comprising a minimum number of operative parts which are readily incorporated into a conventional form of suction cleaner without adding appreciably to the bulk thereof.

It is also an object of the instant invention to provide a filter bag ejecting means in a suction cleaner which includes a novel means for supporting the filter bag within the cleaner. The filter bag supporting means includes a plate which is adapted to seat the filter bag and is constantly biased outwardly of the cleaner, the biasing means being normally restrained to maintain the filter bag and the filter bag supporting structure within the cleaner casing. Upon release of the restraining means, the filter bag supporting means and the filter bag are projected from the cleaner without any further operations, exposing the filter bag beyond the end of the cleaner casing so that it may be easily removed for replacement by a clean filter bag.

The subject invention in a filter bag mounting means is adapted to cooperate with a novel filter bag which includes a mounting pocket formed therein. The filter bag construction, including the mounting pocket, is described and claimed in the applicant's co-pending application Serial No. 481,340, filed on January 12, 1955. The invention as disclosed herein comprises a supporting element which is adapted to be received in the mounting pocket provided on the filter bag, said element being in turn mounted within the cleaner casing for supporting the filter bag therein. Sealing means is included cooperating with the mounting structure for providing the requisite seal at the junction of the dirty air stream inlet conduit of the cleaner and the inlet mouth in the filter bag, to discharge said stream into the bag for separating the dust and like litter from the stream and retaining the same within the confines of the filter bag.

The invention in a filter bag mounting means as described herein also includes an ejecting mechanism for projecting the filter bag out of the cleaner casing when it is desired to service the same. The ejecting mechanism is extremely simple and rugged in its construction comprising a minimum number of structural elements which are readily incorporated within the cleaner casing without unduly adding to the weight or size thereof. It will be apparent to those skilled in the art, from a consideration of the invention as described herein, that there is provided a structure which can be operated by even the most inexperienced person, to easily mount the filter bag in a cleaner for cleaning operations, with complete assurance that the filter is properly assembled. The invention is further enhanced by the provision of means automatically forming an airtight seal of the filter bag inlet mouth with the air inlet conduit of the suction cleaner, merely upon assembling the latter prior to operation thereof.

Figure 2:
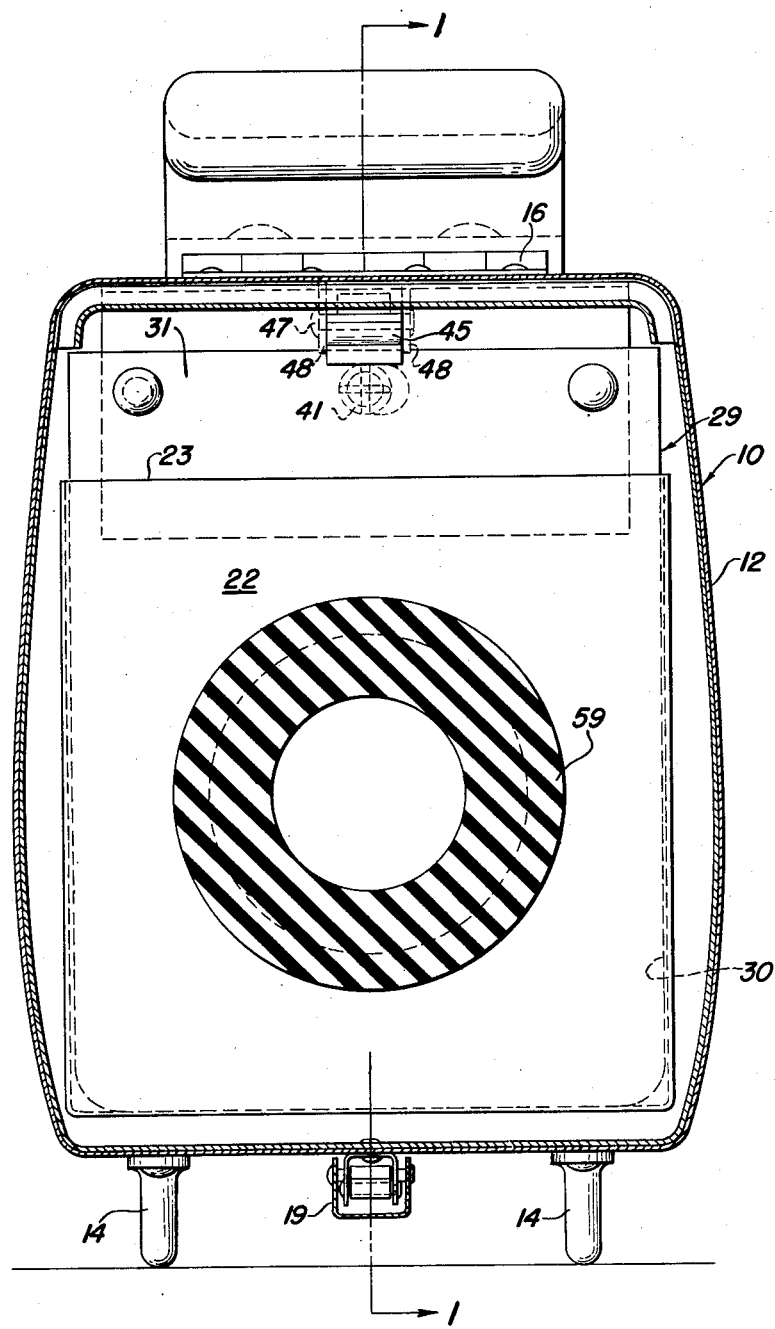
Figure 3:
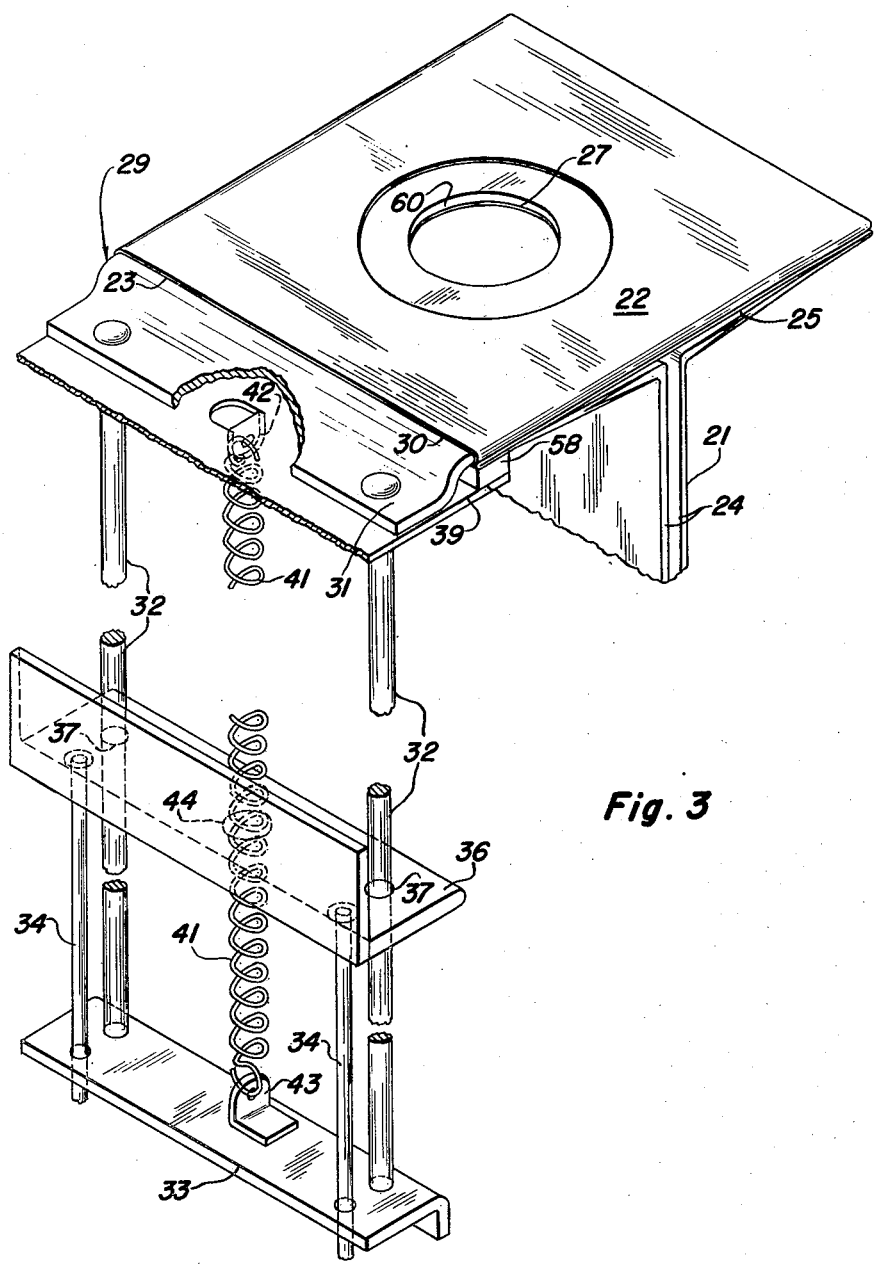
Figure 4:
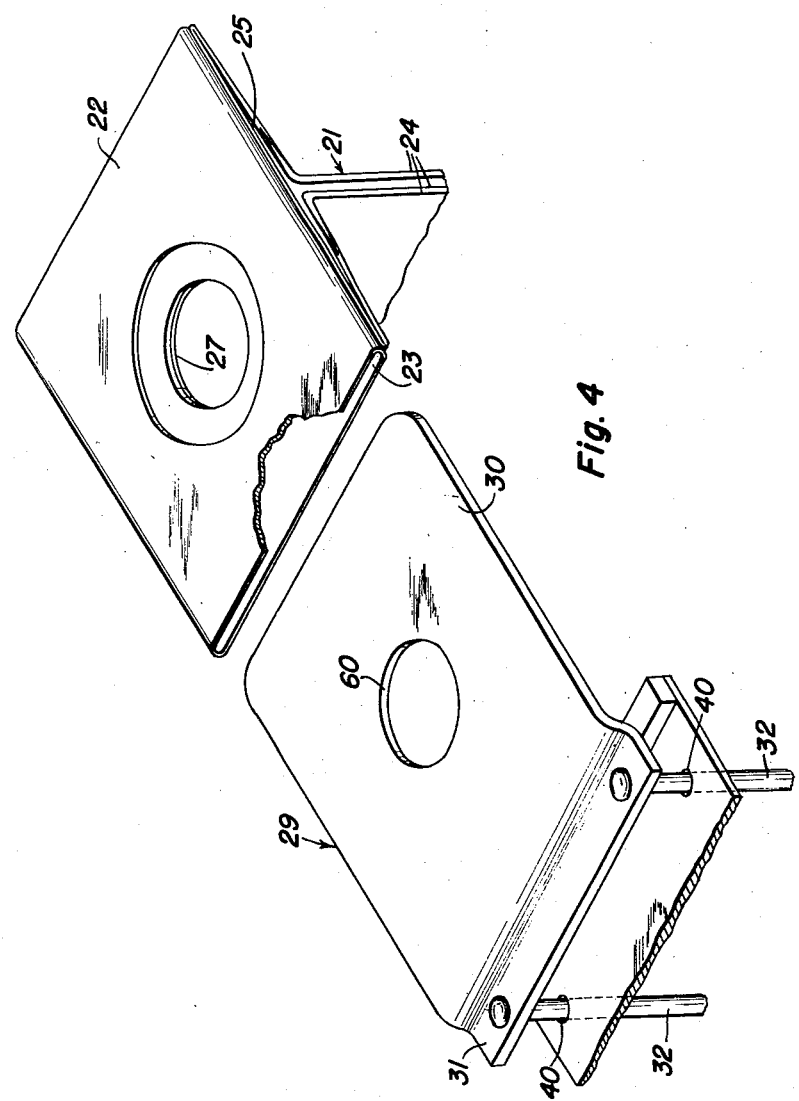

Further objects and advantages of the instant invention will be apparent to those skilled in the art upon consideration of the detailed description of a preferred embodiment of the invention which follows, reference being had to the drawings in which:

Fig. 1 is a sectional view of a suction cleaner embodying the instant invention taken on line 1—1 in Fig. 2, Fig. 2 is a sectional view of a suction cleaner embodying the instant invention taken on line 2—2 in Fig. 1, Fig. 3 is a perspective view of the filter bag supporting means and the guiding structure therefor, and Fig. 4 is an exploded view in perspective of the filter bag mounting plate and the filter mounting pocket.

The novel filter bag mounting means of the instant invention is illustrated in a preferred embodiment as incorporated in a conventional suction cleaner 10 of the tank type, provided with a motor-fan unit 11 located rearwardly of the cleaner casing 12 and exhausting through the rear end 13 thereof. The tank cleaner casing 12 is additionally provided with a pair of skids 14, riveted or otherwise secured to the underside of the casing, to permit ready movement of the cleaner on a supporting surface.

The front end of the tank cleaner 10 is closed by an end cap 15 which is secured to the cleaner casing by a laterally extending hinge 16, having its leaves secured to the top of the cleaner casing 12 and to the top of the end cap 15 providing a pivoted joint therebetween. The end cap 15 is adapted to close the front end of the tank cleaner casing 12 and includes an annular gasket 17 on its rear face which is adapted to be pressed against an annular flange 18 correspondingly disposed on the rim edge of the cleaner casing 12. Upon closing the end cap 15 the gasket 17 is pressed against the flange 18 to seal the joint between the end cap 15 and the cleaner casing 12.

A spring toggle latch 19 is provided on the underside of the cleaner casing 12 to hold the end cap 15 in closed position, and to draw it against the front end of the tank cleaner 10, in order to provide an effective seal between the gasket 17 and the flange 18.

The end cap 15 is further provided with an inlet conduit and coupling 20 for attachment to the cleaner casing 12 of a hose and suction cleaning tool in the manner well known in the art. The hose coupling 20 in the end cap 15 communicates with the interior of a filter bag 21 located in the forward portion of the cleaner casing 12 and extending rearwardly therefrom to adjacent the motor-fan unit 11. The application of suction to the hose and cleaning tool is through the walls of the filter bag 21, the latter being impervious to the passage of dust and like litter and retaining same within the confines of the filter bag, while the air passes through the walls of the filter bag and exhausts through the rear end 13 of the cleaner.

The filter bag 21 illustrated in the drawings is of the disposable type preferably made of air pervious paper which is intended to be used but once, after which the bag and its contents are discarded and replaced by a new filter bag, thus avoiding the objectionable process of cleaning the filter bag. The filter bag 21 is formed with a laterally extending pocket 22 of generally square or rectangular configuration closed on three sides and provided with an opening 23 to the pocket 22 disposed on an edge of the filter bag.

The filter bag 21 illustrated in the drawings is in an initially folded flat form, with the side walls thereof folded flat on pleats 24. The pleated side walls of the filter bag 21 terminate in tuck folds folded flat against the laterally extending end wall 25. The filter bag end wall 25 is normally folded flat against the body of the folded flat filter bag 21 to provide an article which is substantially flat in order that it may be conveniently packaged. Prior to assembly with the suction cleaner 10 the filter bag 21 has its end wall 25 separated from the body of the bag to a position extending laterally of the body as illustrated in Figs. 1 and 4, for a purpose to be described hereinafter. Upon operation of the suction cleaner, the filter bag 21 is expanded to its full volume as indicated by the outline 26 in Fig. 1.

The filter bag mounting pocket 22 may be integrally formed with the body of the filter bag 21, or alternatively, it may be separately formed and attached to the end wall 25 of the bag 21 by an adhesive or like means. In the preferred construction of the filter bag 21, the end wall 25 is formed with an inlet mouth 27 centrally disposed in the end wall 25. The mounting pocket 22 overlies the end wall 25, is coextensive therewith and includes opening 28 aligned with the bag mouth 27 and providing access to the interior of the filter bag for the discharge of the dirty air stream thereinto. The construction of the filter bag may be best understood by reference to the applicant's co-pending patent application.

The novel filter bag mounting means of the instant invention includes a filter bag supporting plate 29 extending laterally of the cleaner casing 12 and normally positioned in the front end thereof immediately behind and adjacent to the end cap 15. The filter mounting portion 30 of the supporting plate 29 is adapted to receive the inlet end of the filter bag 21, the former being slid into the pocket 22 of the latter. One edge 31 of the supporting plate 29 projects beyond the pocket 22 and is offset towards the rear of the cleaner casing 12 for a purpose to be described hereinafter.

The filter bag supporting plate 29 is secured to the forward ends of a pair of slide rods 32 which extend longitudinally of the cleaner casing 12 and rearwardly of the supporting plate 29. The forward ends of the slide rods 32 are riveted or secured by like conventional means to the corners of the offset portion 31 of the supporting plate 29. The rearwardly disposed ends of the slide rods 32 are secured in like manner to a header 33 which rides on a pair of stationary guide rails 34 extending longitudinally of the cleaner casing 12 and parallel to the slide rods 32.

The rear ends of the guide rails 34 are secured to the cleaner casing 12 by rivets 35 or like means and the front ends of the guide rails 34 are secured to bracket 36, which extends laterally inwardly from the top wall of the cleaner casing 12 and is secured thereto by a rivet 38. The bracket 36 is provided with a pair of spaced apertures 37 aligned with the slide rods 32, and through which the slide rods 32 pass for guiding thereof. It will be apparent that the assembly comprising the filter bag supporting plate 29, the slide rods 32 and the header 33 is reciprocably mounted in the cleaner casing 12 of the suction cleaner 10, and upon opening of the end cap 15 may be slid outwardly of the front end of the suction cleaner 10 from its normal position as illustrated in Fig. 1.

There is provided in the front end of the cleaner casing 12 a plate 39 extending laterally inwardly from the top wall thereof provided with a pair of apertures 40 aligned with the slide rods 32, and through which the slide rods 32 slide for further guiding thereof. The plate 39 may be secured to the cleaner casing as by welding or the like, and is positioned in the cleaner casing 12 to limit the inward movement of the filter bag supporting plate 29 in a manner to be described in detail below.

In accordance with the instant invention means is provided for constantly biasing the supporting plate 29 and the filter bag 21 outwardly of the front end of the cleaner casing 12. In the preferred embodiment this biasing means comprises a helical tension spring 41 extending longitudinally of the cleaner casing 12 and parallel to the slide rods 32. The tension spring 41 is anchored at one end to an ear 42 formed integrally with the stop plate 39 and the opposite end of the spring 41 is secured to an ear 43 welded or otherwise secured to the header 33. The bracket 36 is provided with an aperture 44 aligned with the spring 35 and through which the latter passes. The spring 41 being under constant tension provides a constant bias urging the supporting plate 29 and the filter bag 21 outwardly of the front end of the cleaner casing 12 by tending to pull the header 33 and the assembly secured thereto to its extended filter exposing position.

In order to oppose the force of the spring 41 tending to project the filter bag supporting plate 29 outwardly of the cleaner to eject the filter bag, there is provided in the cleaner casing 12 a latch 45 having a detent 46 which is adapted to latch over the front of the offset portion 31 on the edge of the filter bag supporting plate 29. The latch 45 is centrally located on the top wall of the cleaner casing 12 in substantial alignment with the tension spring 41 so as to be in direct opposition to the force thereof, and thereby most effectively oppose the spring force to maintain the filter bag supporting plate 29 and the filter bag 21 in the normal position thereof as illustrated in Fig. 1.

The latch 45 is pivotally mounted on pin 47 which is secured in ears 48 formed integrally with the stop plate 39 and extending laterally thereof to opposite sides of the latch 45. The central portion 50 of the latch 45 is cut away to leave a space for a torsion spring 49 carried on pin 47, with one end 51 bearing against the stop plate 39 and the opposite end 52 bearing on the latch 45 to bias it in a direction latching the filter bag supporting plate 29 in its normal position as illustrated in Fig. 1. The latch 45 is formed with a rearwardly extending integral tongue 53 which bears against the upper wall of the suction cleaner casing 12 to limit the movement of the latch 45 towards its latching position when the filter supporting plate 29 is extended, for reasons which will appear below. The forward end of the latch 45 is formed with an integral and forwardly extending operator 54 which is disposed within the cavity 55 when the end cap is closed. The cavity 55 is of such size as to freely pass the operator 54 upon opening the end cap, the latch being manually operated to release the filter mounting means for projection of the filter bag.

Upon the filter bag 21 becoming filled with dust and like litter to the extent that it is no longer effective as a filter, it may be serviced by upending the cleaner 10 onto its exhaust end 13. The end cap 15 is released and swung to its open position exposing the operator 54 of the latch 45. The latch 45 may then be withdrawn from latching engagement with the offset edge 31 of the supporting plate 29 to release the latter. The tension spring 41 being operative to constantly urge the supporting plate 29 outwardly of the cleaner casing, it will project the filter bag 21 and the supporting plate 29 beyond the open end of the cleaner casing. Projection of the filter bag 21 outwardly of the casing 12 is limited by abutment of the header 33 against the bracket 36.

With the filter bag supporting plate 29 and the filter bag 21 in the projected position, the filter bag 21 may be easily removed from the supporting plate 29 by slipping the pocket 22 thereof off the filter mounting portion 29 of the supporting plate 30. A new filter bag may then be mounted on the supporting plate 30. The filter bag supporting plate 30 and the filter bag 21 are then pushed inwardly of the cleaner casing 12 in opposition to the force of the tension spring 41, whereupon the offset edge 31 of the filter bag supporting plate 30 contacts the cam surface 57 on the latch 45, forcing the latch 45 to a retracted position to permit the offset edge 31 to seat against the stop plate 39 behind the detent 46 of the latch 45. Upon seating of the supporting plate 30 against the stop plate 39, the latch 45 will automatically spring forwardly to a position in which the detent 46 thereof will abut the offset edge 31, to hold the filter bag supporting plate 30 in its normal position. This movement of the latch 45 is accomplished under the force of the torsion spring 49.

As is well known in the art of suction cleaners, it is necessary that there be provided an airtight seal between the inlet mouth of the filter bag 21 and the hose coupling 20 in the end cap 15, in order that the full suction effect of the motor-fan unit 11 will be applied to the walls of the filter bag 21 without any air leakage in the system. For this purpose the stop plate 39 has secured thereto a laterally extending gasket 58 disposed below the offset edge 31 of the filter bag supporting plate 29. Upon seating the filter bag supporting plate 29 against the stop plate 39, the gasket 58 will bear against the rear of the filter bag mounting portion 30 of the supporting plate 29, pressing the edge of the folded flat end wall 25 of the filter bag 21, adjacent the open side of the pocket 22, against the back of the filter bag supporting plate 29 and effecting a seal in this area.

The end cap 15 is provided with a sealing ring 59 seated on the inner wall thereof and surrounding the hose coupling 20. Upon closing the end cap 15 against the filter bag supporting plate 29, the sealing ring 59 will bear against the filter bag pocket 22, as well as against the filter bag supporting plate 29, on an area surrounding the air inlet mouth 27 in the bag, thereby completing the sealed connection between the filter bag 21 and the inlet conduit 20. The filter bag supporting plate 30 includes a substantially centrally disposed circular opening 60 which registers with inlet mouth in the filter bag end wall 25 and with the inlet conduit 20, to provide access to the interior of the filter bag for discharge of the dirty air stream thereinto.

It will be apparent to those skilled in the art that the instant invention provides a novel filter bag mounting means which facilitates the assembly of the filter bag with the suction cleaner. The pocket 22 provided on the end wall 25 of the filter bag 21 is readily telescoped over the filter mounting portion 30 of the supporting plate 29, and provides a particularly advantageous arrangement in that it avoids the undesirable constructions of the prior art in which the air inlet conduit of the suction cleaner is telescoped within the mouth of the filter bag, with the possibility of tearing the latter, or otherwise failing to effect an airtight seal between the filter bag mouth and the air inlet conduit. In accordance with this invention the pocket 22 is snugly received on the complementally formed supporting plate 30 for positively securing and locating the filter bag within the cleaner, without any further operations on the part of the user. Merely closing the end cap and latching it in place produces the requisite seal at the junction of the air inlet conduit and the mouth of the filter bag, whereupon the cleaner is properly conditioned for cleaning operations.

While the instant invention in a filter bag mounting means has been disclosed in a preferred embodiment as incorporated in a tank suction cleaner, it will be apparent to those skilled in the art that this embodiment is subject to modifications falling within the scope of the invention. Accordingly, it is not intended that the invention be limited except as set forth in the claims which follow.

I claim:

1. In a suction cleaner having a motor-fan unit for generating a suction flow of air for gathering dust and like litter, and a filter bag interposed in the dirty air stream for separating the dust and like litter therefrom and retaining the same within the confines of the bag, said filter bag including an inlet mouth in one wall thereof for the admission of the dirty air stream and a laterally opening mounting pocket on said one wall, means for mounting the filter bag in the cleaner adapted to be slidably received in said mounting pocket for supporting said one filter bag wall with the mouth in position to have the dirty air stream directed thereinto, means for projecting said mounting means out of the cleaner to expose the filter bag whereby the latter may be removed by merely sliding said bag so as to remove the walls of said pocket from about said mounting means.

2. In a suction cleaner having a motor-fan unit for generating a suction flow of air for gathering dust and like litter, and a filter bag interposed in the dirty air stream for separating the dust and like litter therefrom and retaining the same within the confines of the bag, said filter bag including an inlet mouth in one wall thereof for the admission of the dirty air stream and a laterally opening mounting pocket on said one wall disposed in juxtaposition to the inlet mouth, means for mounting the filter bag in the cleaner comprising a plate adapted to be laterally received in the pocket overlying the mouth and supporting said one filter bag wall with the mouth in position to have the dirty air stream directed thereinto, means mounting the plate for projection out of the cleaner to expose the filter bag whereby the latter may be removed by merely sliding said bag so as to remove the walls of said pocket from about said plate.

3. In a suction cleaner as recited in claim 2 in which the plate and pocket are complementally formed, and the plate is snugly received within the pocket, said plate including an opening aligned with the filter bag mouth providing access to the interior of the filter bag.

4. In a suction cleaner having a motor-fan unit for generating a suction flow of air for gathering dust and like litter, an air inlet conduit for discharging a dirty air stream, and a filter bag interposed in the dirty air stream for separating the dust and like litter therefrom and retaining the same within the confines of the bag, said filter bag including an inlet mouth in one wall thereof for connection to the air inlet conduit and for the admission of the dirty air stream discharged by the conduit, said one filter wall including a laterally opening mounting pocket coextensive with said wall disposed adjacent said mouth, means for mounting the filter in the cleaner comprising a plate adapted to be laterally received within the pocket for supporting said one wall of the filter bag adjacent the air inlet conduit, said plate and pocket being complementally formed and the plate including an opening aligned with the inlet mouth providing access to the interior of the filter bag, a sealing gasket surrounding the air inlet conduit adapted to abut the mounting plate surrounding the opening therein and providing an air-tight sealed junction between the air inlet conduit and the filter bag mouth and gasket means disposed behind the plate adapted to abut the rear of the mounting pocket in opposition to the plate, providing an air tight seal between the pocket and the plate.

5. In a suction cleaner of the tank type having a casing enclosing a motor-fan unit for generating a suction flow of air for gathering dust and like litter, and a filter bag interposed in the dirty air stream for separating the dust and like litter therefrom and retaining the same within the confines of the bag, said casing having an open end, said filter bag including an inlet mouth in one wall thereof adapted to be disposed adjacent said open end of the casing, an end cap closing said open end of the casing and sealing the filter bag therein, an air inlet conduit in said end cap adapted to be connected to the filter bag mouth for discharging a dirty air stream thereinto, said one filter wall including a laterally opening mounting pocket disposed adjacent said mouth, means for mounting the filter in the cleaner comprising a plate disposed at the open end of the casing, said plate being adapted to be laterally received within the pocket for supporting said one wall of the filter bag contiguously to the end cap with the filter mouth in alignment with the air inlet conduit and connecting the conduit to the mouth for directing the dirty air stream thereinto and means mounting said plate in the casing for projection outwardly of the open end thereof, exposing said one wall of the filter bag whereby the latter may be removed by merely sliding said bag so as to remove the walls of said pocket from about said plate.

6. In a suction cleaner having a casing and an end cap sealing one end of said casing for enclosing a filter bag therein, said filter bag including a laterally opening pocket, means adapted to be laterally received in the pocket in said filter bag for supporting the filter bag in the casing, said means being reciprocably mounted within the casing for projection outwardly of the casing, and means for biasing said supporting means outwardly of the end of the casing to expose the filter bag for lateral removal thereof from the filter bag supporting means and the casing.

7. In a suction cleaner having a casing and an end cap sealing one end of said casing for enclosing a filter bag therein, said filter bag including a laterally opening pocket, means adapted to be laterally received in the pocket in the filter bag for supporting the filter bag in the casing, said means being reciprocably mounted within the casing for projection outwardly of the casing, means for constantly biasing said supporting means outwardly of the end of the casing to expose the filter bag for lateral removal thereof from the filter bag supporting means and the casing, and means for restraining said supporting means in opposition to the biasing means to retain the filter bag supporting means and the filter bag within the casing.

8. In a suction cleaner having a casing and an end cap sealing one end of the casing for enclosing a filter bag therein, said filter bag including a laterally opening pocket, a supporting plate adapted to be laterally received in the pocket in the filter bag for supporting the filter bag in the casing, said plate being reciprocably mounted within the casing for projection outwardly of the casing, means for constantly biasing said supporting plate outwardly of the casing to expose the filter bag for lateral removal thereof from the filter bag supporting plate and the casing, and a releasable latch for restraining said supporting plate in opposition to the biasing means to retain the supporting plate and the filter bag within the casing.

9. In a suction cleaner having a casing and an end cap sealing one end of said casing for enclosing a filter bag therein, said filter bag including a pocket, a supporting plate adapted to be received in the pocket in the filter bag for supporting the filter bag in the casing, said plate being reciprocably mounted within the casing for projection outwardly of the casing, means for constantly biasing said supporting plate outwardly of the end of the casing to expose the filter bag for removal thereof from the filter bag supporting plate and the casing, stop means in the casing for limiting the inward movement of the supporting plate, said stop means including gasket means adapted to abut the filter bag in opposition to the plate and press the same into sealing engagement with the back of the supporting plate, and a releasable latch for restraining said supporting plate in opposition to the biasing means to retain the supporting plate and the filter bag within the casing with the rear of the supporting plate abutting the gasket means.

10. In a suction cleaner having a casing and an end cap sealing one end of said casing for enclosing a filter bag therein, said filter bag including a pocket, a supporting plate adapted to be received in the pocket in the filter bag for supporting the filter bag in the casing, said supporting plate including rods extending longitudinally of the casing, said supporting plate and rods being supported in the casing for reciprocal movement relatively thereto for projection outwardly of the casing, a header secured to the ends of the rods opposite the supporting plate, said header being guided on the casing for sliding movement relatively thereto, spring means anchored to the casing adjacent said one end thereof and secured to the header to constantly bias said supporting plate outwardly of the end of the casing to expose the filter bag for removal thereof from the filter bag supporting plate and the casing.

11. In a suction cleaner having a casing and an end cap sealing one end of said casing for enclosing a filter bag therein, said filter bag including a pocket, a supporting plate adapted to be received in the pocket in the filter bag for supporting the filter bag in the casing, said supporting plate including rods extending longitudinally of the casing, said supporting plate and rods being supported in the casing for reciprocal movement relatively thereto for projection outwardly of the casing, a header secured to the ends of the rods opposite the supporting plate, said header being guided on the casing for sliding movement relatively thereto, spring means anchored to the casing adjacent one end thereof and secured to the header to constantly bias said supporting plate outwardly of the end of the casing to expose the filter bag for removal thereof from the filter bag supporting plate and the casing, stop means in the casing for limiting the inward movement of the supporting plate, said stop means including gasket means adapted to abut the filter bag and press the same into sealing engagement with the back of the supporting plate, and a latch for restraining said supporting plate in opposition to the biasing means to retain the supporting plate and the filter bag within the casing with the rear of the supporting plate abutting the gasket means.

References Cited in the file of this patent

UNITED STATES PATENTS

| 808,170 | Rogers | Dec. 26, 1905 |

FOREIGN PATENTS

| 469,379 | Great Britain | July 23, 1937 |